United States Patent [19]
Usui

[11] Patent Number: 6,003,934
[45] Date of Patent: Dec. 21, 1999

[54] VEHICLE FRONT FRAME STRUCTURE

[75] Inventor: Tomohiro Usui, Kanagawa-ken, Japan

[73] Assignee: Nissan Motor Co., Ltd., Kanagawa-ken, Japan

[21] Appl. No.: 08/989,856

[22] Filed: Dec. 12, 1997

[30]    Foreign Application Priority Data

Dec. 13, 1996    [JP]    Japan ................................. 8-333261

[51] Int. Cl.⁶ ................................................. B62D 25/08
[52] U.S. Cl. ..................... 296/203.02; 296/189; 296/204
[58] Field of Search ............................. 296/194, 203.01, 296/204, 205, 203.03, 188, 189

[56]            References Cited
            U.S. PATENT DOCUMENTS 2,976,079    2/1961    Schilberg .
4,684,151    8/1987    Drewek .................................. 280/784
4,986,597    1/1991    Clausen .................................. 296/205

FOREIGN PATENT DOCUMENTS 6-278646    10/1994    Japan .

*Primary Examiner*—Dennis H. Pedder
*Assistant Examiner*—Mickki D. Murray
*Attorney, Agent, or Firm*—McDermott, Will & Emery

[57]            ABSTRACT

A vehicle front frame structure in which an impact-absorbing extension frame is formed from an inverted U-shaped upper piece overlapping an upright U-shaped lower piece. Because the upper surface of the extension frame is formed only of the U-shaped upper piece, the need for a conventional joined construction is eliminated, thus allowing the upper surface only to be strengthened to provide the optimum desired impact absorbing deformation characteristics.

8 Claims, 3 Drawing Sheets

VEHICLE FRONT FRAME STRUCTURE

The content of Application No. TOKUGANHEI 8-333261 filed Dec. 13, 1996, in Japan is hereby incorporated by reference.

BACKGROUND OF THE INVENTION

The present invention relates to a specific structure for the front part of a vehicle frame.

As taught by Japanese Patent Laid-Open No. 6-278646, there is an automotive vehicle frame design in which the front part of the vehicle frame is comprised of an extension frame positioned so as to extend in the forward direction from the front end of vehicle's side frame member. The side frame member is aligned longitudinally with the vehicle's fore-aft axis, and its front part is inclined downward in the area where the aforesaid extension frame is installed. The upper surface of the extension frame is of an approximate flat configuration, and the entire extension frame itself extends forward and upward in relation to the downward inclination of the side frame member. When a heavy impact load is applied to the extension frame, it progressively collapses in a manner whereby the distortion begins at the forward-most part of the extension frame and proceeds toward the rear. The collapsing structure eventually assumes a V-shape as it approaches its energy-absorbing limit. In order to increases the extension frame's energy absorbing capacity, it is comprised of two overlapping. U-shaped components called the extension frame inner and extension frame outer which, when assembled, form a closed cross sectional area.

The extension frame inner and outer components are connected to the outer surfaces on the end of the side frame member, and also to the first cross member which meets the side frame member in the lateral direction in relation to the vehicle's fore-aft axis. A gusset piece is installed over the upper surface of the extension frame, and also to the side frame and cross member, with the purpose of increasing the strength of the extension frame.

SUMMARY OF THE INVENTION

In regard to the impact absorbing frame design discussed above, while it is possible to strengthen the top surface of the extension frame to obtain the optimum degree of energy absorption efficiency, this is difficult in practice due to the structure which creates an enclosed cross section by means of specifically located joints on the upper surface of the extension frame. In order to make the upper surface of the extension frame stronger, the entire extension frame must be made from thicker metal, a method of strengthening which would add considerable weight to the vehicle.

Moreover, the structure in which the inner and outer extension frame components are simply attached to the outer surfaces of the side frame makes the attachment operation unnecessarily difficult in that there is no reference to position the inner and outer extension frame components in the lateral direction nor in the vehicle fore-aft direction.

Furthermore, the need to reinforce the installation of the extension frame to the frame side member and cross member by means of a gusset piece adds more components and complexity to the assembly operation.

In view of the forgoing, it is an object of the present invention to provide a structure for an energy-absorbing extension frame whereby the optimum degree of energy absorbing efficiency can be obtained without adding weight to the vehicle, whereby the assembly operation of attaching the extension frame to the vehicle frame is simplified and whereby the number of components used in the extension frame assembly is reduced.

According to one aspect of the present invention, for achieving the above-mentioned object, there is provided a vehicle front structure having a side frame and an extension frame. The side frame is disposed along a vehicle's fore-aft direction and includes a front extremity portion being inclined in a downward direction. The extension frame includes a rear extremity portion being connected to the forward end of the front extremity portion and extends forward. The extension frame is constructed of an upper frame and lower frame. The upper frame appears as an inverted U-shape in cross section and has mutually facing vertical flanges formed on both sides along the longitudinal direction. The lower frame appears as an upright U-shape in cross section and has mutually facing vertical flanges formed on both sides along the longitudinal direction. The extension frame is assembled by the upper and lower frames which are mutually joined by the overlapping connection of the aforesaid flange parts whereby an enclosed cross sectional area is formed.

It is desirable that the rear extremity portion of the extension frame curves upward.

The structure delineated above allows the upper surface of the extension frame to be independently comprised of the upper frame only. As there are no joints on this upper surface, the upper part of the extension frame can be easily strengthened to obtain optimum energy-absorbing efficiency when deforming in reaction to a large impact load.

It is preferable that the upper frame is made to a thicker material cross section that the lower frame part.

As only the upper frame need be constructed with a thicker cross section, the upper surface of the extension frame can be made to sufficient strength with reduced overall vehicle weight.

It is preferable that a rear part of the upper frame is attached to an outer side of the side frame and a rear part of the lower frame is attached to an inner side of the side frame.

As a result of this structure, the rear areas of the extension frame's upper and lower frames envelope the side frame and thus position the extension frame at the desired location in the lateral direction. This greatly simplifies the assembly operation when the extension frame is attached to the vehicle frame. Also, the overlapping arrangement of the flanges on the upper and lower frames allows for a great deal of dimensional variation between the components, thus further improving assembly efficiency.

A first cross member, oriented in the vehicle's lateral direction in relation to the longitudinally oriented side frame, is attached to the forward extremity of the side frame. It is preferable that a rear part of the upper frame extends in a longitudinal direction so as to attach to the first cross member and the front extremity portion of the side frame.

The strength of the assembly is increased because the rear part of the upper frame extends over and attaches to the side frame, and as the aforesaid rear part also attaches to the first cross member, the need for a reinforcing gusset is eliminated and the number of components reduced.

It is desirable that a lower surface of the lower frame is disposed in a upwardly facing incline and the extension frame is of gradually decreasing cross section as it extends forward.

As the lower surface of the lower frame is inclined in this manner, the cross section of the lower frame becomes progressively smaller toward the front of the vehicle. As a result, the cross sectional area progressively increases toward the rear of the extension frame, thus allowing impact loads (resulting from a frontal vehicle collision will) to progressively deform the extension frame beginning at its forward-most end and proceeding toward the rear. The progressively increasing deformation resistance of the extension frame provides an efficient energy absorption characteristic in response to the applied load.

Also, because the lower surface of the lower frame is inclined upward, a larger approach angle is maintained to provide greater road clearance when the vehicle traverses from a flat road surface to an upwardly inclined road surface.

It is preferable that the extension frame incorporates a multiplicity of groove depressions formed in a lateral direction around the extension frame at specific intervals.

These groove depressions will crush to absorb energy imparted from a forward vehicle collision in a manner as to further control the extension frame's energy absorbing and deformation characteristics.

It is desirable that the lower frame part includes an angular flange formed at a rear of one of the flanges (inner flange) and the angular flange is connected to the first cross member.

As this structure allows the rear of one of the flanges (inner flange) to be attached to the front surface of the first cross member, the overall attachment strength of the extension frame to the vehicle frame is further strengthened.

DESCRIPTION OF THE PREFERRED EMBODIMENT

Figure 1:
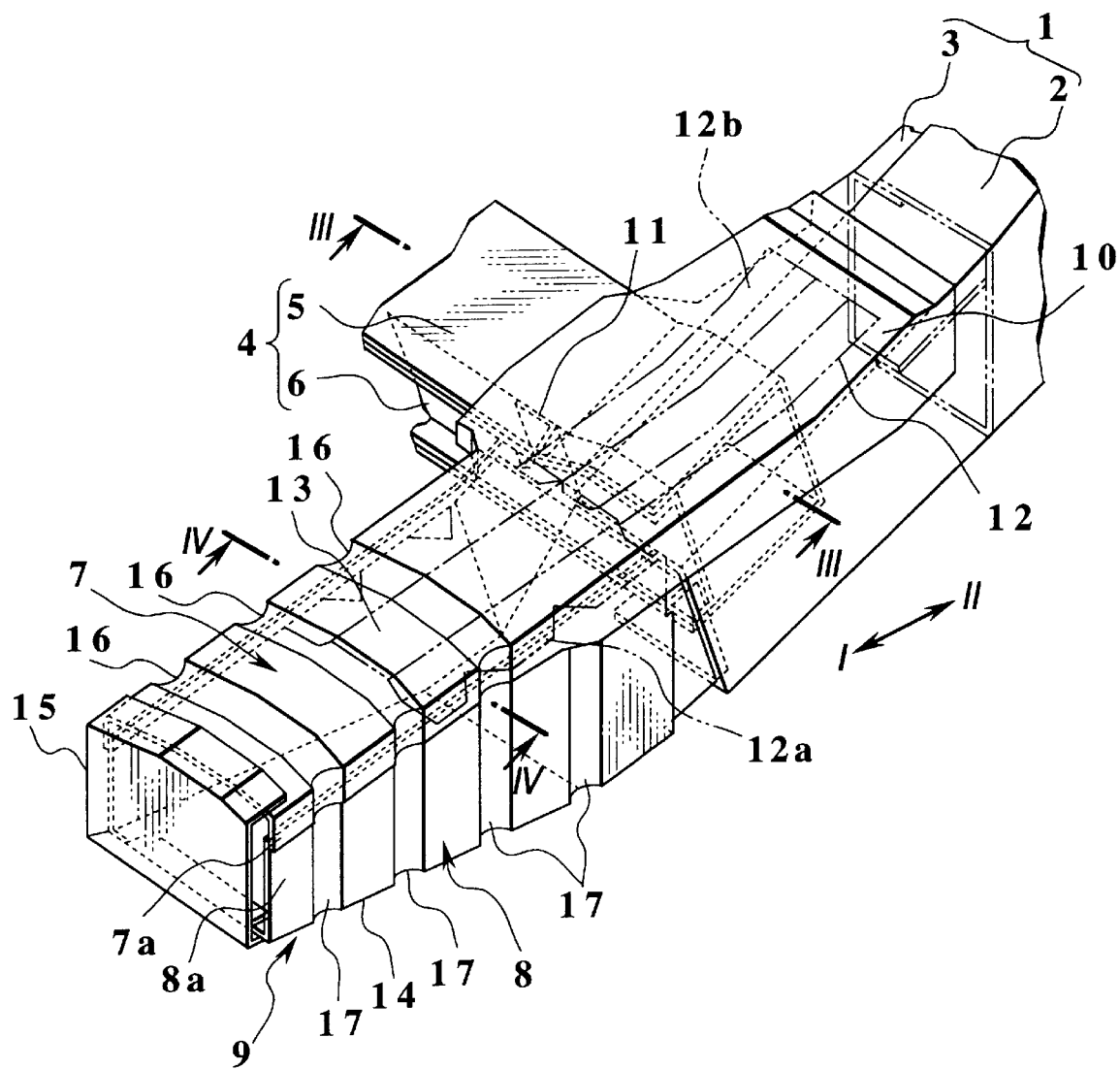
FIG. 1 is an oblique view of the frame structure prescribed by the present invention.
Figure 2:
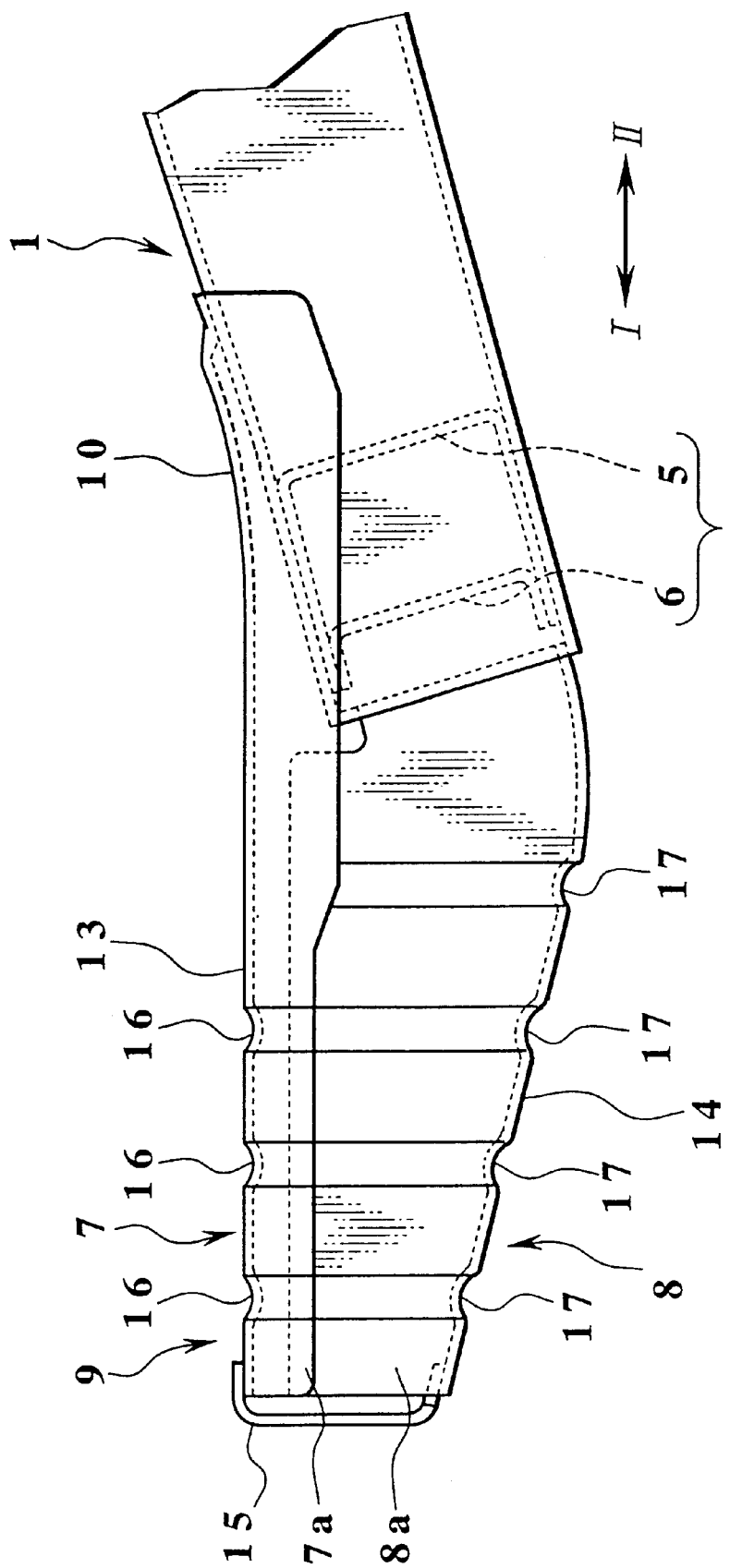
FIG. 2 is a side view of the frame structure prescribed by the present invention.
Figure 3:
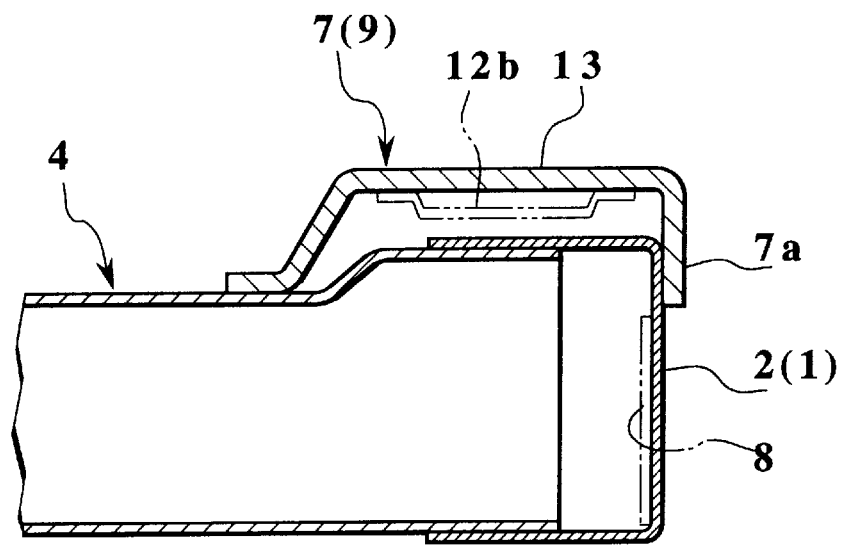
FIG. 3 is a cross section at line III—III in FIG. 1.
Figure 4:
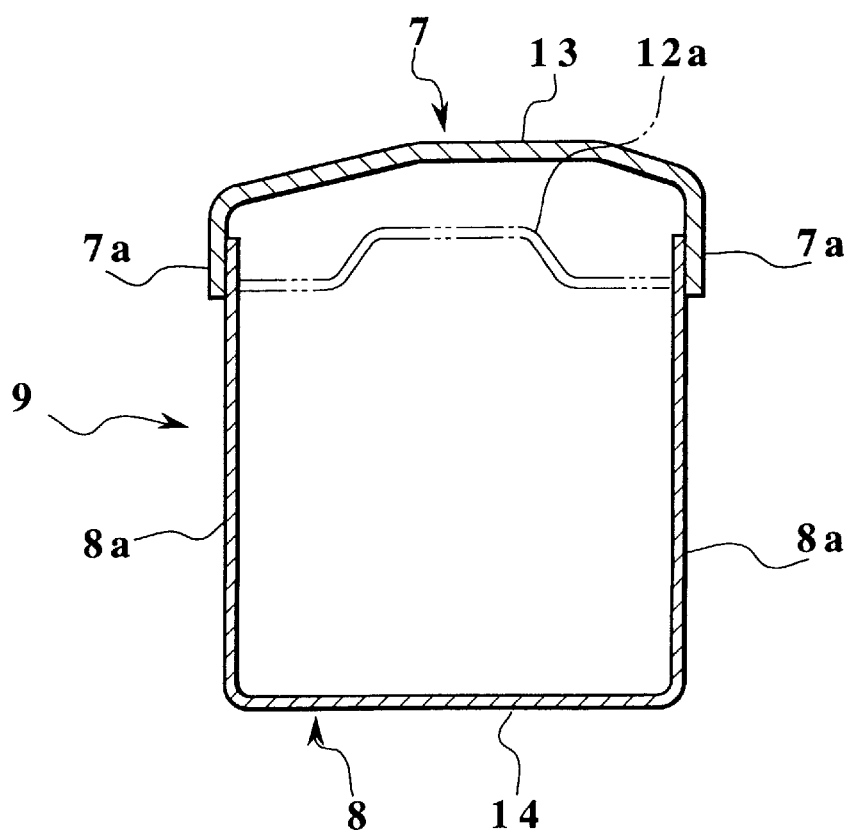
FIG. 4 is a cross section at line IV—IV in FIG. 1.

The following discussion presents the preferred embodiments of the invention with reference to FIGS. 1, 2, and 3. "I" represents the front of the frame, and "II" the rear.

Side frame 1 is disposed longitudinally along the vehicle's fore-aft axis. Left side frame only is shown in the figures. Side frame outer 2 component, U-shaped in cross section, is connected to side frame inner 3 so as to form an enclosed cross space whose forward end part is inclined downward at a specific angle.

The side frame outer 2 is dimensionally longer than side frame inner 3, and as a result of this longer dimension, the end part of the side frame 1 is comprised only of the area of the side frame outer 2 which extends beyond the side frame inner 3. First cross member 4, disposed in the transverse direction in relation to the vehicle's fore-aft axis, is connected and installed to the front end of the side frame outer 2.

The first cross member 4 is comprised of U-shaped cross member back piece 5 and closing plate 6. The closing plate 6 is joined to the forward edges of the open side of the cross member back piece 5 in a manner as to form an enclosed space with the closing plate 6 comprising the front surface. Both ends of the first cross member 4 are formed with a slight bulge on their upper surface, and are installed and connected to the upper and lower inner surfaces at the end of the side frame outer 2.

Extension frame 9, which has an enclosed space defined by upper frame 7 and lower frame 8, is installed and connected to the front end of the side frame 1. While the lower frame 8 has the same material thickness as the side frame 1, the upper frame 7 is made with a larger material thickness dimension than the side frame 1.

The upper frame 7 has an inverted U-shape cross section formed by small flanges 7a which define the downward projecting legs of the inverted U-shape. The lower frame 8 has an upright U-shaped cross section formed by large flanges 8a which define the upward projecting legs of the upright U-shape. The small flanges 7a and the large flanges 8a mutually overlap with the flanges 8a positioned on the inside of the flanges 7a.

Rear part 10 of the upper frame 7 extends rearward over the side frame 1. Only the rear portion 10 of the upper frame 7 is attached to the upper surfaces of the side frame 1 and the first cross member 4, while the flange 7a at the rear portion 10 is attached to the outer vertical surface of the side frame The rear part of the lower frame 8 is attached to the inside surface of the side frame 1. More specifically, the bottom surface of the extension frame 9 rides on the inside lower surface of the side frame outer 2. Furthermore, the outer flange 8a is inserted into and connected to the inside of the side frame outer 2. Angular section 11 is formed at the extreme rear end of the flange 8a on the side of the lower frame 8 facing the center of the vehicle, and is installed and connected to the closing plate 6 of the first cross member 4.

A rear reinforcement part 12b is attached to the underside of the upper frame 7, and extends along the front area of the upper frame 7. In front of the rear reinforcement part 12b, a front reinforcement part 12a is attached to the inner surface of the lower frame 8. A cross section of the front reinforcement part 12a shows a raised center area, the surfaces adjacent to this raised center area being attached between the large flanges 8a. A cross section of the rear reinforcement part 12b shows a dropped center area, the surfaces on both sides of this dropped center area being attached to the lower surface of the upper frame 7 at the rear part 10. The front reinforcement part 12a acts to prevent the collapse of flange 8a toward the inside, and also reinforces the attachment strength of the lower frame 8 and the upper frame 7. While the reinforcement part 12 is included in this embodiment, the invention will provide the same effect if reinforcement part 12 is not used.

Upper surface 13 of the extension frame 9 has an approximately flat in cross section, and turns upward as it extends from the end of the downwardly inclined front extremity portion of the side frame 1. Furthermore, lower surface 14 of the extension frame 9 inclines upward from the end of the side frame 1 in a manner as to continually reduce the cross sectional size of the extension frame 9 in the forward advancing direction. End plate 15 is attached to the front end of the extension frame 9, and a bracket (not shown) is attached to the end plate 15.

As the cross section of the extension frame 9 is larger at the rear than at the front, and as the lower surface 14 of the extension frame 9 inclines upward, a larger approach angle is maintained to provide greater road clearance when the vehicle traverses from a flat road surface to an upwardly inclined road surface.

Three transverse grooves 16 are formed in the upper frame 7 in the transverse direction and located at specific intervals in sequence from the front of the extension frame 9. Four grooves 17 are formed in the lower frame 8 in a manner as to coincide with the locations of the grooves 16 in the upper frame 7.

The extension frame 9 is formed by flanges 7a and 8a of the upper frame 7 and the lower 8 mutually overlapping at specific width dimensions, those width dimension being specified to correspond to the dimensions of the side frame 1 at the points where the upper frame 7 and the lower 8 attach to it. As a result, the flanges 7a and 8a are able to mutually and accurately overlap in a manner which automatically compensates for any variance in their length dimensions.

The extension frame 9 is inclined in an upward direction from the point where it attaches to the front end of the side frame 1. Rear part 10 of upper frame 7 attaches to the upper surface of the side frame 1, and the rear part of the lower frame 8 is inserted within the side frame 1. As the upper frame 7 and the lower frame 8 are held in mutual alignment due to their overlapping connection, the rear part of the lower frame 8 accurately mates with the corresponding inner part of the side frame 1, while the rear part 10 of the upper frame 7 is in contact with the upper surface of the side frame 1.

The position of the extension frame 9 on the side frame 1 is established by the rear outer flange of the upper frame 7 enclosing the outer surface of the side frame 1, the location of the upper frame 7 being determined by the overlapping connection of the flanges 7a and 8a.

In this manner, the extension frame 9 can be easily and accurately positioned and connected to the side frame 1. The extension frame 9 attaches to the side frame 1, the rear part 10 of the upper frame 7 attaches to the upper surface of the first cross member 4, and the angular flange 11 (located at the rear of the flange 8a) attaches to the closing plate 6 on the first cross member 4. The overall strength of the extension frame 9 is reinforced because the rear part 10 of the upper frame 7 connects to the upper surface of the first cross member 4 as well as the side frame 1. Moreover, as the extension frame 9, the side frame 1, and the first cross member 4 are all in fixed and mutual attachment, the need for a reinforcing gusset is eliminated, and the number of components comprising the complete vehicle frame is reduced.

As the upper surface 13 of the extension frame 9 is comprised of the upper frame 7 only, the conventional flanged joint construction is eliminated. This has the result of strengthening the upper surface of the extension frame 9 in a manner which allows for the optimum deformation pattern to be generated when a collision results in a strong impact load being applied to the front of the vehicle.

Moreover, the strength of the upper surface 13 of the extension frame 9 can be increased by simply increasing the thickness of the material used to fabricate upper frame 7. As there is no particular need to increase the material thickness of the frame lower 8, vehicle weight can be reduced without any sacrifice in the frame's shock-absorbing ability.

Furthermore, because the cross sectional area of the extension frame 9 gradually becomes larger as the cross section traverses from the front of the extension frame toward the rear, the extension frame 9 is able to provide steadily increasing crush deformation resistance as the impact deformation proceeds through the increasingly larger cross section, and as a result is able to provide greater energy absorbing efficiency in response to impact loads of various strengths.

Moreover, the multiple grooves 16 and 17 aid in defining the progressive front to rear deformation pattern which, as stated previously, results from the continuing enlargement of the extension frame's cross section.

What is claimed is:

1. A vehicle front frame structure comprising:

a side frame member disposed along a vehicle's foreaft direction, said side frame member including a front extremity portion being inclined in a downward direction, and an extension frame member including a rear extremity portion being connected to the forward end of said front extremity portion, said extension frame member extending forward; wherein said extension frame member is constructed of an upper frame part and lower frame part, said upper frame part is of inverted U-shaped cross section with vertically disposed flange parts formed longitudinally on both sides, said lower frame part is of upright U-shaped cross section with vertically disposed flange parts formed longitudinally on both sides, and said upper and lower frame parts are mutually joined by said flange parts.

2. A vehicle front frame structure as claimed in claim 1, wherein said upper frame part has a thicker material cross section than said lower frame part.

3. A vehicle front frame structure as claimed in claim 1, wherein a rear part of said upper frame part is attached to an outer side of said side frame member, and a rear part of said lower frame part is attached to an inner side of said side frame member.

4. A vehicle front frame structure as claimed in claim 1, further comprising a first cross member disposed in a transverse direction and attached to said front extremity portion of said side frame, and wherein a rear part of said upper frame part extends in a longitudinal direction so as to attach to said first cross member and said front extremity portion of said side frame member.

5. A vehicle front frame structure as claimed in claim 1, wherein a lower surface of said lower frame part is disposed in a upwardly facing incline, and said extension frame member is of gradually decreasing cross section as it extends forward.

6. A vehicle front frame structure as claimed in claim 1, wherein said extension frame member incorporates a multiplicity of groove depressions formed in a lateral direction around the extension frame member at specific intervals.

7. A vehicle front frame structure as claimed in claim 4, wherein said lower frame part includes an angular flange formed at a rear of one of said flange parts, and said angular flange is connected to said first cross member.

8. A vehicle front frame structure as claimed in claim 1, wherein said rear extremity portion of said extension frame member curves upward.

* * * * *